US012128551B1

United States Patent
Qu et al.

(10) Patent No.: US 12,128,551 B1
(45) Date of Patent: Oct. 29, 2024

(54) RIGID-FLEXIBLE COUPLING GRIPPER

(71) Applicant: Tsinghua Shenzhen International Graduate School, Guangdong (CN)

(72) Inventors: Juntian Qu, Guangdong (CN);
Hongwei Hao, Guangdong (CN);
Xiankuan Qian, Guangdong (CN);
Xiaohao Wang, Guangdong (CN);
Houde Liu, Guangdong (CN); Baijin Mao, Guangdong (CN); Jiaqi Zhu, Guangdong (CN); Weichen Wang, Guangdong (CN)

(73) Assignee: Tsinghua Shenzhen International Graduate School, Guangdong (CN)

( * ) Notice: Subject to any disclaimer, the term of this patent is extended or adjusted under 35 U.S.C. 154(b) by 0 days.

(21) Appl. No.: 18/676,362

(22) Filed: May 28, 2024

Related U.S. Application Data

(63) Continuation of application No. PCT/CN2024/093560, filed on May 16, 2024.

(30) Foreign Application Priority Data

Mar. 19, 2024 (CN) ........................ 202410313163.9
Mar. 19, 2024 (CN) ........................ 202410313165.8

(51) Int. Cl.
*B25J 15/12* (2006.01)
(52) U.S. Cl.
CPC ..................................... *B25J 15/12* (2013.01)
(58) Field of Classification Search
CPC ....................................................... B25J 15/12
See application file for complete search history.

(56) References Cited

U.S. PATENT DOCUMENTS

| | | | | |
|---|---|---|---|---|
| 5,108,140 A | * | 4/1992 | Bartholet | B25J 15/0009 294/115 |
| 8,720,964 B2 | * | 5/2014 | Birglen | B25J 15/08 901/39 |
| 8,973,958 B2 | * | 3/2015 | Allen Demers | B25J 15/0266 901/39 |
| 10,688,668 B2 | * | 6/2020 | Zhang | B25J 15/0009 |

FOREIGN PATENT DOCUMENTS

| | | |
|---|---|---|
| CN | 2931214 Y | 8/2007 |
| CN | 109333193 A | 2/2019 |
| CN | 111618902 A | 9/2020 |
| CN | 216657219 U * | 6/2022 |
| CN | 117464714 A | 1/2024 |
| CN | 220548296 U | 3/2024 |

* cited by examiner

*Primary Examiner* — Stephen A Vu
(74) *Attorney, Agent, or Firm* — Winston Hsu

(57) ABSTRACT

A rigid-flexible coupling gripper, includes: a support unit; a rigid gripper unit and a flexible gripper unit connected to the support unit, wherein the rigid gripper unit and the flexible gripper unit are connected in parallel; the rigid gripper unit includes a sector gear connected to the support unit and a rigid gripper connected to the sector gear and capable of moving driven by the sector gear; a motor drive unit connected to the rigid gripper unit and including a motor and a partial gear including a toothed portion and a non-toothed portion, wherein the motor is connected to the partial gear for driving the partial gear to rotate; the sector gear is configured for being meshed with the toothed portion of the partial gear; and a pneumatic drive unit connected to the flexible gripper unit for driving the flexible gripper unit into a bending deformation.

12 Claims, 6 Drawing Sheets

RIGID-FLEXIBLE COUPLING GRIPPER

CROSS REFERENCE TO RELATED APPLICATIONS

This application is a continuation application of PCT Application No. PCT/CN2024/093560, filed on May 16, 2024. The content of the application is incorporated herein by reference.

BACKGROUND OF THE INVENTION

1. Field of the Invention

The present application relates to the technical field of mechanical grippers, and in particular to a rigid-flexible coupling gripper with a switchable rigid-flexible mode.

2. Description of the Prior Art

With the rapid development of mechanical automation, there are various types of mechanical grippers on the market today, which exist in the form of rigid, flexible and rigid-flexible coupling, respectively. These grippers all play an important role in their respective fields of application. Rigid mechanical grippers dominate industrial automation with their stability and high efficiency, while flexible grippers exhibit unique advantages in handling fragile or fragile items by virtue of their good adaptability and safety. However, while the prior art has brought much convenience to us, there are still some challenges that need to be addressed. Especially for rigid-flexible coupling grippers, although they try to combine the stability of rigid grippers with the adaptability of flexible grippers, they perform quite slowly in the speed of mode switching. This limitation in speed may result in missing the best opportunity to grab in a practical application, or failing to respond in time in a rapidly changing scene. At present, there are rigid-flexible coupling gripper solutions using dual pneumatic driven rigid flexible grippers, but such solutions still have problems such as limited response speed, difficult control of output force, being easy to be affected by gas leakage, low energy efficiency and so on.

Therefore, there is an urgent need in the market for a new type of gripper that can not only inherit the wide range of grasping capabilities of rigid grippers and the good adaptability of flexible grippers, but also achieve a faster speed in the response of mode switching, so as to better cope with various complex and varied working environments, and improve the overall working efficiency and accuracy of grasping.

SUMMARY OF THE INVENTION

The main object of the present application is to propose a rigid-flexible coupling gripper, which solves the technical problems of the rigid gripper unit of the existing rigid-flexible coupling gripper that is difficult to control accurately, has poor stability and has low grasping accuracy.

In order to solve the above-mentioned technical problems, the technical solution provided by the application is as follows.

A rigid-flexible coupling gripper includes: a support unit; a rigid gripper unit and a flexible gripper unit connected to the support unit, wherein the rigid gripper unit and the flexible gripper unit are connected in parallel; the rigid gripper unit includes a sector gear connected to the support unit and a rigid gripper connected to the sector gear and capable of moving driven by the sector gear; a motor drive unit connected to the rigid gripper unit and including a motor and a partial gear, wherein the partial gear includes a toothed portion and a non-toothed portion, the motor is connected to the partial gear for driving the partial gear to rotate; the sector gear is configured for being meshed with the toothed portion of the partial gear; the motor is capable of driving the partial gear to rotate until the toothed portion is meshed with the sector gear, and is also capable of driving the partial gear to rotate until the non-toothed portion corresponds to the sector gear, namely, in a non-meshed state; the motor drive unit can switch between driving and non-driving of the rigid gripper unit by switching between the meshed and non-meshed states; and a pneumatic drive unit connected to the flexible gripper unit for driving the flexible gripper unit into a bending deformation.

Further, the flexible gripper unit includes at least two flexible grippers; the rigid gripper unit includes at least two sets of rigid grippers; each set of rigid grippers includes two of the rigid grippers; each set of rigid grippers is respectively connected in parallel with one flexible gripper; the parallel connection renders that: when the rigid gripper moves under the drive of the motor drive unit, the flexible gripper is moved to generate a bending deformation; and the flexible gripper moves the rigid gripper when the flexible gripper undergoes the bending deformation under the drive of the pneumatic drive unit.

Further, the two rigid grippers of each set of rigid grippers are located on both sides of the flexible grippers connected in parallel therewith; and finger roots of each of the rigid grippers are respectively connected to one of the sector gears.

Further, the motor is a two-axis motor; each set of rigid grippers is driven by one two-axis motor; one of the partial gears is respectively arranged on both sides of each two-axis motor; and the two-axis motor is respectively connected to the partial gear on a side where the two-axis motor is located via keys on the both sides.

Further, the ratio of the circumference ratio of the toothed portion to the non-toothed portion of the partial gear is 15:12 to 19:12.

Further, the sector gear has a sector central angle of 60°-80°.

Further, the motor is capable of driving the rigid gripper to produce an angular change of 5°-58°.

Further, the flexible gripper of the flexible gripper unit includes a flexible finger inner layer, a fiber, a flexible finger surface layer and a strain limiting layer; the flexible finger inner layer has an inflatable hollow structure connected to a gas pump of the pneumatic drive unit, and is inflated and deformed by inflating the flexible finger inner layer; the fiber is wrapped around the periphery of the flexible finger inner layer for limiting lateral expansion of the flexible finger inner layer; the flexible finger surface layer is sheathed on the outside of the flexible finger inner layer and extendable along the length direction driven by the flexible finger inner layer; the strain limiting layer is connected to the flexible finger inner layer, and the deformation thereof is less than the deformation of the flexible finger inner layer, so that the flexible finger inner layer and the flexible finger surface layer bend towards a side where the strain limiting layer is located when inflated, so as to realize the bending deformation of the flexible gripper unit.

Further, the rigid gripper includes a fingertip plate, a first strut, a first link, an intermediate plate, a second strut, and a second link; the fingertip plate has a fingertip end and a first connecting portion and a second connecting portion on opposite sides of the fingertip end, and the intermediate plate has a third connecting portion, a fourth connecting portion and a fifth connecting portion; a first end of the first strut is movably connected to the first connecting portion; a first end of the first link is movably connected to the second connecting portion; a second end of the first strut is movably connected to the third connecting portion; a second end of the first link is movably connected to the fourth connecting portion; a first end of the second strut is movably connected to the third connecting portion; a first end of the second link is movably connected to the fifth connecting portion; a second end of the second strut is movably connected to the sector gear, and a second end of the second link is movably connected to the sector gear; one side of the fingertip plate, the first strut and the second strut are connected to the strain limiting layer of the flexible gripper and are in the same plane as the bottom surface of the strain limiting layer to achieve the parallel connection.

Further, a tail portion extending from a central angle of the sector gear, wherein the tail portion is provided with a first mounting hole for mounting the second end of the second link; a second mounting hole is provided at the center of the sector gear for mounting the second end of the second strut; meanwhile, the sector gear is mounted to the support unit via the second mounting hole.

Further, the rigid-flexible coupling gripper further includes a suction cup grasping unit and a second pneumatic drive unit, wherein the suction cup grasping unit is mounted at the end of a free end of the flexible gripper unit and/or the rigid gripper unit, and the suction cup grasping unit is respectively connected in parallel with the flexible gripper unit and the rigid gripper unit; and the second pneumatic drive unit is connected to the suction cup grasping unit.

The advantageous effects of the technical solution of the present application are as follows. The present application adopts a motor as a driving source of the rigid gripper unit. By the cooperation of the partial gear and the sector gear, on the one hand, the problem that the accuracy of the movement of a pneumatic driven rigid gripper is not high due to the difficulty in accurately controlling the inflation amount and the air inlet speed is solved. Also, by using the way of meshing the motor driving gears, the accurate control of the rotation angle can be achieved, and the grasping accuracy of the rigid gripper is improved, so that the rigid-flexible coupling gripper can achieve large weight and high accuracy grasping. On the other hand, the motor drives the partial gear to mesh/unmesh with the sector gear. In the meshed state, the rigid gripper can be directly driven by the motor, so as to implement high stability, large weight and high precision grasping. In the meshed state, when the motor stops working, or in the non-meshed state, even if the motor is still running, it is merely idle, and does not drive the rigid gripper to move. In this case, the pneumatic driven flexible gripper can be used to implement high adaptability and high safety grasping for fragile and fragile objects. When it is necessary to switch to rigid primary grasping, the response speed of the motor drive is faster than that of the pneumatic drive, so that the rigid-flexible coupling gripper of the present application is improved in the response speed of mode switching. Furthermore, in the prior art, when the rigid gripper is driven pneumatically, it is difficult to accurately control the inflation amount and the air inlet speed, and even an additional gas pressure controller needs to be provided. However, the rigid gripper of the present application is driven by a motor, and the pneumatic drive unit of the rigid gripper is omitted. Therefore, the gas pump of the rigid gripper and the gas pump of the flexible gripper are not required to perform the cross switching of the air inlet and inflation, and the structure and control thereof are more simplified. Finally, the prior art requires increasing the grip force of the rigid gripper by increasing the pressure in the cylinder, which places higher demands on the sealability of the cylinder. The present application can significantly increase the grip force of the rigid gripper by driving with a large torque of the motor, so that the present application is easier to increase the upper limit of the grasping weight.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
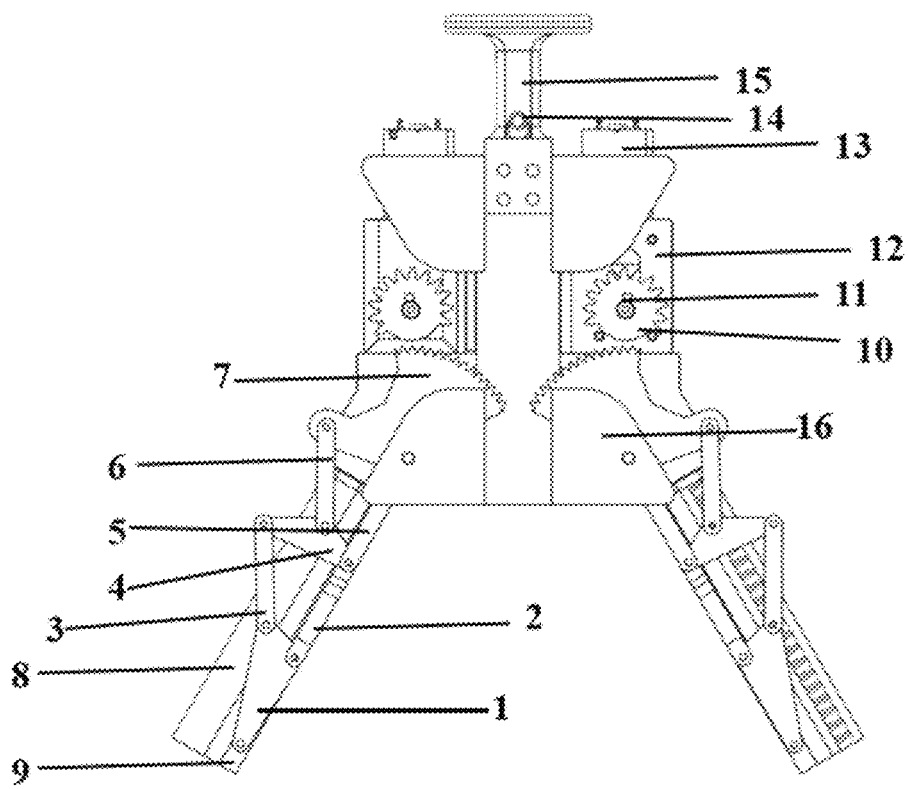
FIG. 1 is a front view of a rigid-flexible coupling gripper according to Embodiment 1 of the present application.

The present application will now be further described with reference to the accompanying drawings and detailed description.

The driving speed of the cylinder in the existing double pneumatic drive rigid-flexible coupling gripper is limited in the driving speed by factors such as the flow speed of the gas and the structure and size of the cylinder, and is usually slower than the response speed driven by the motor. For application scenarios requiring rapid response, such as a high-speed production line or a mechanical arm requiring rapid positioning, and scenarios requiring rapid switching of a grasping mode, it is obviously not applicable. Secondly, the output force of the cylinder is limited by the gas pressure and the piston area, so that it is difficult to achieve precise control. Thus, it is difficult to control the motion accuracy of the rigid gripper and the grasping accuracy is not high. Furthermore, the gas in the cylinder may leak, resulting in insufficient or unstable gas pressure, affecting the normal operation of the cylinder, and seriously reducing the working stability of the rigid gripper for grasping a large weight. Finally, since most of the energy driven by the cylinder is consumed in compressing the gas and overcoming the friction, its energy efficiency is severely reduced for the rigid gripper for grasping the large weight.

To sum up, the existing rigid coupling grippers still have the problems of poor stability, low energy efficiency, limited driving response speed and slow mode switching response speed caused by low grasping accuracy and the output force which is difficult to be accurately controlled. In view of this, embodiments of the present application provide a new type of rigid-flexible coupling gripper to solve the above-mentioned problems by changing the driving mode of the rigid gripper and the connection mode between the rigid gripper and its drive unit. The rigid-flexible coupling gripper proposed by the embodiments of the present application can not only inherit the wide range of grasping capacity of the rigid gripper and the good adaptability of the flexible gripper, but also precisely control the movement accuracy of the rigid gripper and improve the grasping accuracy of the rigid gripper. In addition, it is more stable when the rigid gripper is controlled to grip an object with a large weight. Furthermore, it can respond faster when the mode is switched, and can better cope with various complicated and varied working environments, so as to improve the overall working efficiency of the gripper and the accuracy of grasping.

A detailed description of the structure and operating principle of the rigid-flexible coupling gripper according to the embodiment of the present application will be given below with reference to the accompanying drawings. It should be understood that the embodiments are provided for illustrative purposes only and are not intended to limit the structure of the rigid-flexible coupling grippers of the present application. In addition, the spatial and location terms "upper", "lower", "left", "right" and the like in the description are used for the convenience of describing the relative positional relationship between the constituent parts of the rigid-flexible coupling gripper, and do not mean that only the swing direction is shown in the drawings. In actual use, as the product swings in different directions (e.g., rotated by 90 degrees or other directions), the spatially relative description for describing the swing direction should also be interpreted in a similar manner. Furthermore, the terms "first", "second", and the like are used solely to distinguish one element from another. It should be understood that the elements should not be limited by such terms, and the elements themselves do not mean that the elements has the aforementioned ordinal number, nor does it represent the order in which one element is arranged or made from another element.

Embodiment 1

Figure 1A:
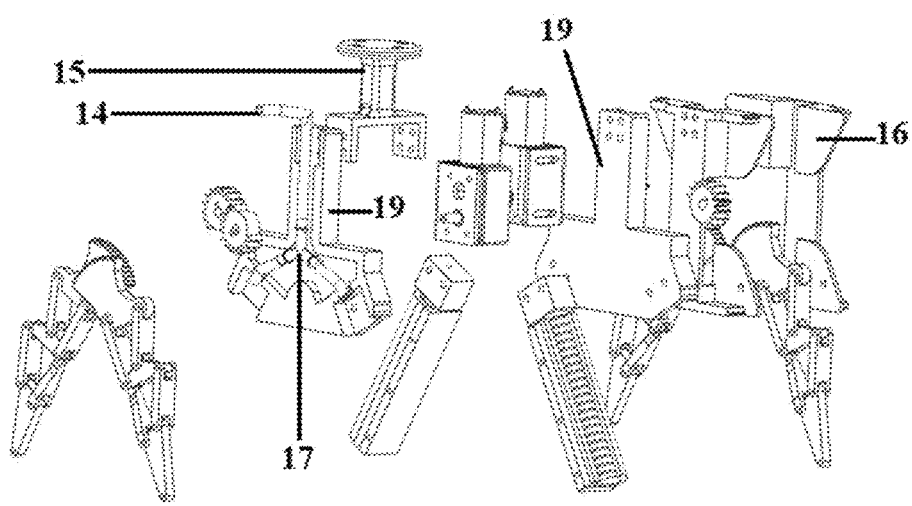
FIG. 1A is an exploded view of the rigid-flexible coupling gripper shown in FIG. 1.

Referring to FIGS. 1 and 1A, a rigid-flexible coupling gripper includes: a support unit, a rigid gripper unit and a flexible gripper unit connected to the support unit, a motor drive unit connected to the rigid gripper unit, and a pneumatic drive unit connected to the flexible gripper unit. The rigid gripper unit is connected in parallel with the flexible gripper unit. The rigid gripper unit includes a sector gear 7 connected to the support unit and a rigid gripper connected to the sector gear 7. The motor drive unit includes a motor 13 and a partial gear 10. The partial gear 10 includes a toothed portion and a non-toothed portion. Herein, the motor 13 is connected to the partial gear 10 for driving the partial gear 10 to rotate. The sector gear 7 is arranged to be meshed with the toothed portion of the partial gear 10, so that when the sector gear is meshed with the toothed portion, the sector gear is capable of rotating with the rotation of the partial gear so as to move the rigid gripper and is adapted to perform a grasping action which is dominated by rigid grasping. The pneumatic drive unit is used to drive the flexible gripper unit to generate bending deformation, so as to perform high-adaptability and damage-free flexible grasping.

Since the rigid-flexible coupling gripper has the above-mentioned structure, a control method for the rigid-flexible coupling gripper includes: when the object to be grasped needs to be rigidly grasped, controlling the rotation of the motor to drive the partial gear to rotate until the toothed portion is meshed with the sector gear, so that the rigid gripper can move driven by the motor via the partial gear and the sector gear; and controlling the pneumatic drive unit to drive the flexible gripper unit into a bending deformation when the object to be grasped needs to be flexibly grasped.

Further, when the object to be grasped needs to be grasped flexibly and does not need to be grasped rigidly, the motor is controlled to stop driving or the motor is controlled to rotate so as to drive the partial gear to rotate until the non-toothed portion corresponds to the sector gear (namely, a non-meshed state), and the pneumatic drive unit is controlled to drive the flexible gripper unit to generate a bending deformation.

The control method of the rigid-flexible coupling gripper described above is described in detail as follows, including the following steps.

A1: the step of grasping the object to be grasped and the grasping type in each step are determined according to the action to be performed by the object to be grasped, the grasping type including at least one of rigid grasping and flexible grasping; and A2: a corresponding grasping action is performed according to the grasping type in each step:

A21: when the object to be grasped needs to be grasped rigidly, the motor is controlled to rotate so as to drive the partial gear to rotate until the toothed portion is meshed with the sector gear, so that the rigid gripper can move driven by the motor via the partial gear and the sector gear;

A22: when the object to be grasped needs to be grasped flexibly, the pneumatic drive unit is controlled to drive the flexible gripper unit to generate a bending deformation; and A23: when the object to be grasped needs to be grasped flexibly and does not need to be grasped rigidly, the motor is controlled to stop driving or controlling the motor to rotate so as to drive the partial gear to rotate until the non-toothed portion corresponds to the sector gear (non-meshed state), and the pneumatic drive unit is controlled to drive the flexible gripper unit to generate a bending deformation.

When the grasping type in the corresponding step only includes rigid grasping, step A21 is performed. At this time, the rigid gripper is movable under the drive of the motor; accordingly, the rigid gripper can drive the flexible gripper to generate a bending deformation by a parallel connection with the flexible gripper; and in this case, the rigid gripper is active, the flexible gripper is driven, and the rigid grasping is mainly performed. Herein, when performing the rigid grasping, it is possible to control the motor to drive the partial gear corresponding to only a partial set or all of the rigid grippers to rotate until the toothed portion is meshed with the sector gear. Namely, the movement of a partial set or all of the rigid grippers is controlled. For example, controlling the movement of only one set of the rigid grippers can also achieve rigid grasping of the object to be grasped.

When the grasping type in the corresponding step only includes flexible grasping, the step A23 is performed. At this time, the flexible gripper generates a bending deformation under the drive of the pneumatic drive unit. Correspondingly, the flexible gripper can drive the rigid gripper to move through a parallel connection with the rigid gripper. In this case, the flexible gripper is active, the rigid gripper is driven, and the flexible grasping is dominant. The rigid gripper may provide a certain grasping strength for the flexible grasping. Herein, when performing flexible grasping, the pneumatic drive unit may be controlled to drive some or all of the flexible grippers therein to generate a bending deformation. For example, controlling only one of the flexible grippers to generate a bending deformation can also achieve flexible grasping of the object to be grasped.

When the grasping type in the corresponding step includes both rigid grasping and flexible grasping, the step A21 and the step A22 are performed simultaneously. Accordingly, the rigid gripper and the flexible gripper therein may also control the action of the rigid gripper and the corresponding flexible gripper of the partial set at the same time, and may also realize the rigid grasping and the flexible grasping of the object to be grasped at the same time.

In a scenario where high precision and high stability grasping is required, such as assembly, handling, etc., the rigid grasping can be performed by means of a motor-driven rigid gripper unit, i.e., performing step A21 to achieve accurate grasping and movement. The motor-driven can provide powerful power and accurate and stable control to ensure high stability, reliability and accuracy of the rigid gripper when performing such tasks. When it is desired to grab a scene of irregularly shaped, dimensionally varying objects, such as fruits, vegetables, etc., only flexible grasping, i.e. performing step A23, can be used to achieve adaptive, non-invasive grasping. The flexible gripper unit has the feature of self-adaptive grasping, which can be automatically adjusted according to the shape and size of the object to improve the adaptability and success rate of grasping. A person skilled in the art would be able to determine a grasping mode to be used according to article information such as the shape, size, weight and material of an object to be grasped, and then control the rigid-flexible coupling gripper via a control system to perform grasping and mode switching.

It should be appreciated that the rigid-flexible coupling gripper of embodiments of the present application may also be performed simultaneously with a motor driven rigid gripper and a pneumatically driven flexible gripper to give full play to their respective advantages and achieve a more efficient and stable grasping effect. In this case, however, the direction of movement of the rigid gripper should coincide with the direction of movement of the flexible griper. This flexible combination makes rigid-flexible coupling grippers have excellent adaptability and efficiency in dealing with various complex grasping tasks. For example, in the scenario of grasping some heavy objects but relatively precise articles, both rigid grasping and flexible grasping may be simultaneously performed, namely, the step A21 and the step A22 are performed simultaneously. At this time, the motor drive can provide strong power and accurate and stable control. Meanwhile, the flexible gripper unit can be automatically adjusted according to the shape and size of the objects, so as to improve the adaptability and success rate of grasping, and the cooperation can give full play to the respective advantages, so as to achieve a more efficient and stable grasping effect.

A person skilled in the art would be able to determine a grasping mode to be used according to article information such as the shape, size, weight and material of an object to be grasped, and then control a rigid-flexible coupling gripper of an embodiment of the present application via a control system to perform grasping and mode switching. In addition, when the rigid-flexible coupling gripper of the embodiment of the present application is operated, the motor can generate a greater torque by increasing the input voltage or current of the motor, so as to improve the driving proportion of the motor drive unit. It is also possible to increase the drive duty of the pneumatic drive unit by increasing the pressure of the air supply. According to different grasping requirements and scenarios, it is possible to flexibly adjust the driving ratio of the motor drive unit and the pneumatic drive unit, so as to realize the adjustment and control of the grasping range and the grasping close fit degree of the rigid-flexible coupling gripper. For example, for grasping fragile articles or precision parts, a softer grasping action may be achieved by increasing the driving ratio of the pneumatic drive unit, so as to avoid article damage. In heavy handling, hoisting and other application scenarios, the drive ratio of the motor drive unit may be increased to overcome gravity and friction.

Figure 8:
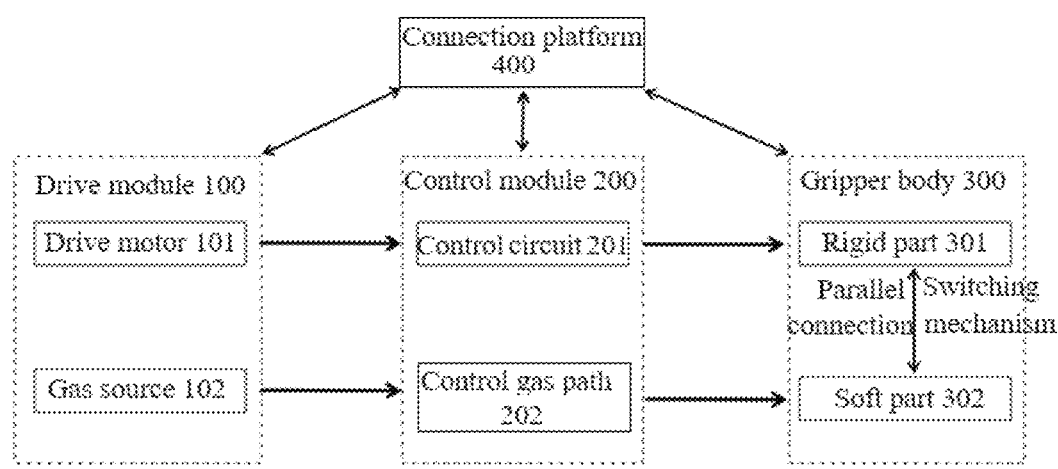
FIG. 8 is a block diagram of a control system of a rigid-flexible coupling gripper according to Embodiment 1 of the present application.

As shown in FIG. 8, the above-mentioned control system for the rigid-flexible coupling gripper may include a drive module 100, a control module 200 and a connection platform 400. The drive module 100 includes a drive motor 101 (corresponding to the above-mentioned motor drive unit) and a gas source 102 (corresponding to the above-mentioned pneumatic drive unit) for providing motive power for a gripper body 300 (corresponding to the support unit, the rigid gripper unit and the flexible gripper unit of the above-mentioned rigid-flexible coupling gripper). The control module 200 includes a control circuit 201 and a control gas path 202 for controlling the output force of the gripper body 300 in different modes. The connection platform 400 includes a mechanical connection platform, a circuit connection platform, and a gas path connection platform. A drive motor 101 in the drive module 100 drives a rigid part 301 (corresponding to the rigid gripper unit) in the gripper body 300 via the control circuit 201 in the drive control module 200. The gas source 102 in the drive module 100 drives a soft body part 302 (corresponding to the flexible gripper unit) of the gripper body via the control gas path 202 in the control module 200. By adjusting a switching module, the rigid part 301 and the soft part 302 of the gripper body 300 can work independently or together when grasping an object, so as to cooperatively complete the grasping of a complex object. The driving motor 101 in the drive module 100 can be either a stepping motor (which can be a PWM speed regulator) or a worm gear motor (which needs to be additionally provided with a direct current motor driving plate to achieve accurate control) for providing the power used by the rigid part 301. The gas source 102 in the drive module 100 may be an air compressor or a gas pump to provide power for use by the soft part 302. The principle of controlling the gas path 202 may use solenoid valve deployment.

The flexible gripper unit of the embodiment of the present application includes at least two flexible grippers. The rigid gripper unit includes at least two sets of rigid grippers. Each set of rigid grippers includes two of the rigid grippers. Each set of rigid grippers is respectively connected in parallel with one flexible gripper. The parallel connection renders that: when the rigid gripper moves under the drive of the motor drive unit, the flexible gripper is driven to generate a bending deformation, in this case, the rigid gripper is active, the flexible gripper is driven, and the rigid gripper is dominate; when the flexible grippers generate the bending deformation under the drive of the pneumatic drive unit, the flexible grippers may drive the rigid grippers to move, in this case, the flexible grippers are active, the rigid grippers are driven, and the flexible grippers are mainly used for flexible grasping. The rigid grippers can provide a certain grasping force for flexible grasping. The two rigid grippers of each set of rigid grippers are located on both sides of the flexible grippers connected in parallel therewith, and the finger roots of each rigid grippers are connected to one sector gear 7, respectively. Since the rigid-flexible coupling gripper has the above-mentioned structure, the control method for the rigid-flexible coupling gripper includes: when the object to be grasped needs to be grasped rigidly, controlling the motor to drive the partial gear corresponding to at least one set of the rigid grippers to rotate until the toothed portion is meshed with the sector gear, so that the at least one set of the rigid grippers can move driven by the motor via the partial gear and the sector gear; controlling the pneumatic drive unit to drive at least one of the flexible grippers into a bending deformation when the object to be grasped needs to be flexibly grasped.

Figure 2:
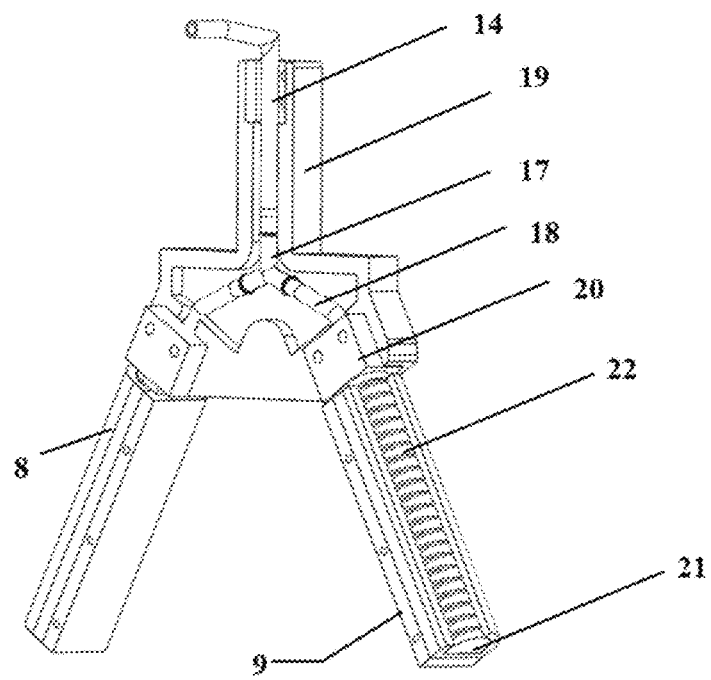
FIG. 2 is a schematic view of a flexible gripper in a rigid-flexible coupling gripper of Embodiment 1 of the present application.

Referring to FIGS. 1, 1A, and 2, in this embodiment, the flexible gripper unit includes two flexible grippers which are symmetrically attached to both sides of the support unit. Each flexible gripper includes a flexible finger inner layer 21, a fiber 22, a flexible finger surface layer 8, and a strain limiting layer 9. The flexible finger inner layer 21 has an inflatable hollow structure connected to a gas pump of the pneumatic drive unit. When the flexible gripper works, the flexible finger inner layer 21 is inflated and deformed so as to performing grasping; the fiber 22 is wound around the periphery of the flexible finger inner layer 21 and is used for limiting the transverse expansion of the flexible finger inner layer 21. The flexible finger surface layer 8 is sheathed on the outside of the flexible finger inner layer 21 and can extend along the length direction driven by the flexible finger inner layer 21. The strain limiting layer 9 is connected to the flexible finger inner layer 21, and the deformation thereof is smaller than the deformation of the flexible finger inner layer 21, so that the flexible finger inner layer 21 and the flexible finger surface layer 8 bend towards a side where the strain limiting layer 9 is located when inflated, so as to realize the bending deformation of the flexible gripper unit for grasping an object. In the manufacturing process of the flexible finger grip, a wire groove is cast on the outer surface of the flexible finger inner layer 21 for fixing the fiber 22. The fiber 22 is wound from one end to the other end of the flexible finger inner layer 21 and is knotted and fixed. After that, the flexible finger inner layer 21 is combined with the flexible finger surface layer 8, the fiber 22 is fixed, and the fiber 22 is fixed by bonding with the strain limiting layer 9 by silica gel after being removed from the mold. Thus, the finger root end of the flexible finger inner layer 21 is sealed with a flexible gripper connecting block 20 to form the hollow structure. A gas pipe is inserted into the hollow structure through the flexible gripper connecting block 20. When the gas is filled into the flexible finger inner layer 21, the flexible finger inner layer 21 is elongated in the length direction, so that the entire flexible gripper has a tendency to stretch. Also, since the deformation of the strain limiting layer 9 is less than that of the flexible finger inner layer 21. Finally, the flexible finger inner layer 21, the flexible finger surface layer 8 and the strain limiting layer 9 are simultaneously bent towards a side where the strain limiting layer 9 is located, and are folded inwards.

It should be understood that the number of flexible grippers of the flexible gripper unit is not limited to two, preferably at least two, and may be three, four or other numbers. The plurality of flexible grippers are preferably evenly distributed circumferentially around the support unit. Preferably, the rigid gripper unit includes the same number of sets of rigid grippers as the number of flexible grippers, e.g., in an embodiment with two flexible grippers, two sets of rigid grippers (four rigid grippers) are included. The number of grippers does not constitute a limitation on the scope of protection of the present application, and a person skilled in the art can design a different number of grippers according to practical requirements.

Figure 3:
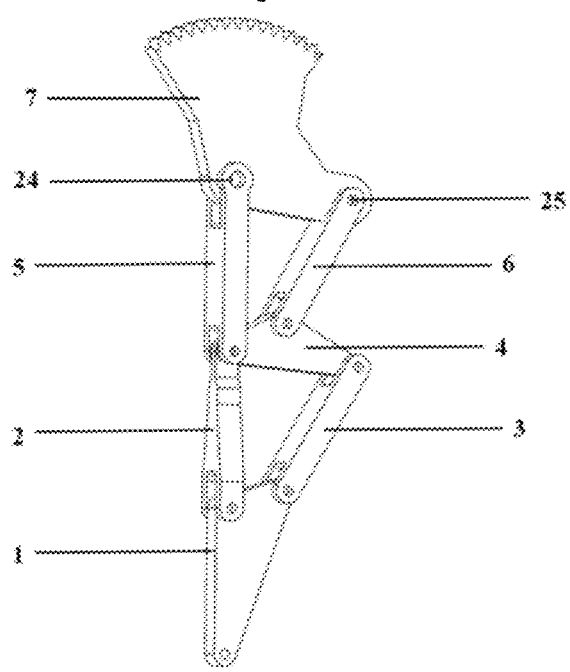
FIG. 3 is a schematic view of a rigid gripper in a rigid-flexible coupling gripper according to Embodiment 1 of the application.

Referring to FIGS. 1, 1A and 3, 3A, in this embodiment, the rigid gripper unit includes two sets of rigid grippers. Each set of rigid grippers includes two rigid grippers disposed on the left and right sides of the flexible gripper in parallel therewith. Each rigid gripper includes a fingertip plate 1, a first strut 2, a first link 3, an intermediate plate 4, a second strut 5 and a second link 6. Here, the fingertip plate 1 has a fingertip end (a lower end as shown in FIG. 3) and a first connecting portion and a second connecting portion located at opposite sides of the fingertip end. The intermediate plate 4 has a third connecting portion, a fourth connecting portion and a fifth connecting portion. In some preferred embodiments, a first end (a lower end as shown in FIG. 3) of the first strut 2 is movably connected to the first connecting portion of the fingertip plate 1. A first end (lower end as shown in FIG. 3) of the first link 3 is movably connected to the second connecting portion of the fingertip plate 1. A second end (an upper end as shown in FIG. 3) of the first strut 2 is movably connected to the third connecting portion of the intermediate plate 4. A second end (an upper end as shown in FIG. 3) of the first link 3 is movably connected to the fourth connecting portion of the intermediate plate 4. A first end (a lower end as shown in FIG. 3) of the second strut 5 is movably connected to the third connecting portion of the intermediate plate 4. A first end (a lower end as shown in FIG. 3) of the second link 6 is movably connected to the fifth connecting portion of the intermediate plate 4. A second end (an upper end as shown in FIG. 3) of the second strut 5 is movably connected to the sector gear 7. A second end (an upper end as shown in FIG. 3) of the second link 6 is movably connected to the sector gear 7. Furthermore, one side of the fingertip plate 1, the first strut 2 and the second strut 5 are all connected to the strain limiting layer 9 of the flexible gripper and are in the same plane as the bottom surface of the strain limiting layer 9, thereby achieving the parallel connection of the rigid gripper and the flexible gripper. Since the rigid-flexible coupling gripper has the above-mentioned structure, the control method for the rigid-flexible coupling gripper includes: when the motor drives the rigid gripper to move, the partial gear rotates the sector gear, and the sector gear moves the second link, the second strut, the intermediate plate, the first link, the first strut and the fingertip plate to achieve a grasping action.

Figure 3A:
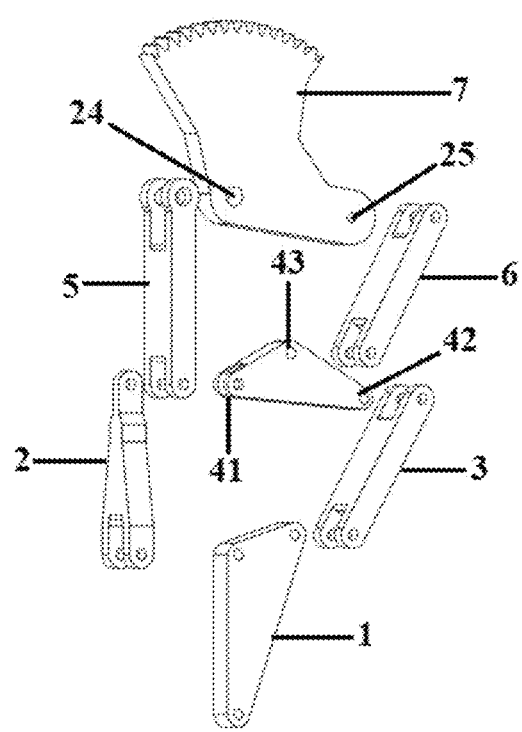
FIG. 3A is an exploded view of the rigid gripper of FIG. 3.
Figure 7:
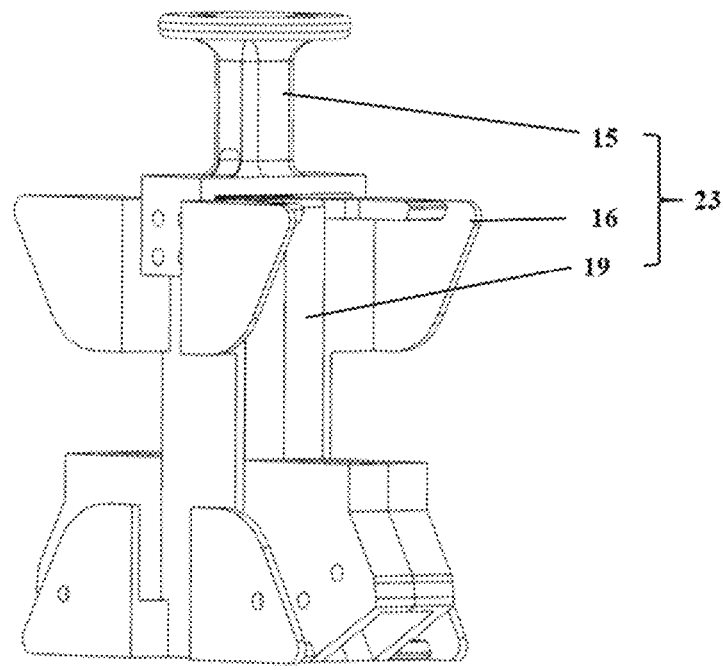
FIG. 7 is a schematic view of a support unit in a rigid-flexible coupling gripper according to Embodiment 1 of the present application.

Referring to FIGS. 3 and 3A, a tail portion is extended at a central angle of the sector gear 7. The tail portion is provided with a first mounting hole 25 for mounting the second end of the second link 6. A second mounting hole 24 is provided at the center of the sector gear 7 for mounting the second end of the second strut 5. Meanwhile, the sector gear 7 is mounted to the supporting unit via the second mounting hole 24. With reference to FIGS. 7 and 2, the supporting unit 23 includes a connecting frame 15, a rib plate 16 and an inner fixing plate 19. The inner fixing plate 19 is provided with a groove on the inner side for accommodating an outer inflation tube 14 and a three-way gas pipe joint 17 of the pneumatic drive unit, and the fixing of the pneumatic drive unit is achieved by fitting and mounting two inner fixing plates 19. In order to ensure the stability of the rigid gripper unit and to prevent it from shaking, the external surface of the inner fixing plate 19 is designed to mate with the internal surface of the rib on the same side, forming two mutually clamped surfaces. This grasping structure effectively limits the free movement of the rigid gripper unit in multiple directions, thus improving the rigidity and stability of the overall gripper structure. The rib plate 16 is symmetrically arranged on the outer sides of the two inner fixing plates 19. Both the rib plate 16 and the inner fixing plate 19 are connected to the connecting frame 15, and the top of the connecting frame 15 is used for connection to a mechanical arm. The sector gear 7, the second end of the second strut 5 and the rib plate 16 are fixed by bolts via the second mounting holes 24.

It should be understood that the present application is not limited to the shapes of the fingertip plate and the intermediate plate. In some embodiments, the fingertip plate 1 and the intermediate plate 4 may be triangular plates. With continued reference to FIGS. 1, 3 and 3A, the shortest side and two corners of the fingertip plate 1 are located at the upper end. The corner located at the lower end is the fingertip end and is connected to the strain limiting layer 9 of the flexible gripper. Two holes are respectively provided at the two corners of the upper end. The hole located at the inner corner is used for mounting the first end of the first rod 2. The hole located at the outer corner is used for mounting the first end of the first link 3. The inner and outer sides are described herein with respect to the grasping action, with the grippers moving inwards to close when grasping, and with the grippers releasing outwards when releasing. The intermediate plate 4 is preferably an obtuse-angled triangle with the shorter side as the power arm and the longest side as the resistance arm, so that a greater rotational effect may be generated or maintained with a smaller force. Three holes are respectively provided at three corners, where the mounting hole at the largest corner is used for mounting the first end of the second link 6, and the mounting holes at the other two corners are respectively used for mounting the second end of the first strut 2 and the second end of the first link 3, where the hole for mounting the second end of the first strut 2 is also used for mounting the first end of the second strut 5 at the same time. Referring to FIG. 3A, in order to facilitate the assembly and movement of the rigid gripper, the two ends of the first link 3, the second link 6 and the second strut 5 are respectively provided with square grooves along the thickness direction of the strut. The larger end of the first strut 2 (the end connected to the fingertip plate, i.e., the first end of the first strut) is also provided with square grooves. The maximum corner end of the fingertip plate 1 is placed into the square groove of the larger end of the first strut 2, and the hole of the maximum corner end of the fingertip plate 1 is coaxially fitted with the hole of the larger end of the first strut 2, so that the first strut 2 and the fingertip plate 1 may rotate relative to each other. The second maximum corner end of the fingertip plate 1 is inserted into the square groove of the first end of the first link 3, and cooperates with the hole of the first end of the first link 3 coaxially, so that the first link 3 and the fingertip plate 1 may also rotate relative to each other. The second maximum corner end 41 of the intermediate plate 4 is provided with a groove along the direction perpendicular to the plate thickness to facilitate assembly and movement. The smaller end of the first strut 2 (the end connected to the intermediate plate 4, namely, the second end of the first strut) is inserted into this groove of the intermediate plate 4, and at the same time, the hole of the second end of the first strut 2 cooperates coaxially with the hole of the second maximum corner end 41 of the intermediate plate 4. Then, the minimum corner end 42 of the intermediate plate 4 is connected to the square groove of the second end of the first link 3, and the maximum corner end 43 of the intermediate plate 4 is connected to the square groove of the first end of the second link 6. In addition, the hole of the second maximum corner end of the intermediate plate 4 is fitted coaxially with the second end of the first strut 2. Meanwhile, the first mounting hole 25 is fitted coaxially with the hole of the second end of the second link 6.

In the embodiment of the present application, since each set of rigid grippers includes two rigid grippers of the same structure. Thus, the motor for driving each set of rigid grippers is a two-axis motor. With reference to FIGS. 1 and 1A, the two-axis motor is connected and fixed to the support unit via an L-shaped fixing plate 12. Two sides of the two-axis motor are respectively provided with keys 11. Two sides of one motor are respectively provided with a partial gear 10, and one partial gear 10 is correspondingly connected to one key 11. In some embodiments, the ratio of the circumference of the toothed portion to the non-toothed portion of the partial gear 10 is 15:12 to 19:12 to ensure proper operation and performance optimization of the gear. In an embodiment of the present application, a ratio of 17:12 is used. In some specific embodiments, the sector central angle of the sector gear is set in the range of 60° to 80°, preferably 70° as the central angle of the sector gear. This choice ensures that the volume of the sector gear is moderate, while its travel is sufficient to meet practical requirements. In the matching of sector gear and partial gear, the two must meet the basic conditions of meshing, including an equal modulus, a consistent pressure angle, an identical tooth profile and an accurate center distance. The satisfaction of these conditions ensures that the sector gear is meshed smoothly with the toothed portion of the partial gear and remains smooth and reliable during transmission. Further, in some embodiments of the present application, the motor is capable of driving the rigid gripper to produce an angular change of 5°-58°.

In the rigid-flexible coupling gripper of the embodiment of the present application, the cooperation of the partial gear and the sector gear is used to realize the mode switching on the basis of using the motor to drive the rigid gripper unit. When the toothed portion of the partial gear of the two-axis motor is meshed with the sector gear, by adjusting the direction of rotation of the motor, the rigid gripper can be driven to fold inwards or expand outwards to correspondingly achieve grasping or releasing. In addition, due to the design of the parallel connection of the rigid gripper and the flexible gripper, when the rigid gripper moves to grasp, the flexible gripper can also be driven to produce bending deformation in the same direction, so as to further enhance the grasping ability of the rigid gripper on an object and ensure a stable and reliable grasping effect. When the sector gear corresponds to the non-toothed portion of the partial gear (no longer meshed with the toothed portion), such as the state shown in FIG. 4, this state is called a non-meshed state. Alternatively, when the motor stops driving although in a meshed state, the flexible grasping is performed by pneumatically driving the flexible gripper. At this time, also due to the parallel connection, the flexible gripper may drive the rigid gripper to generate a certain rotation, so as to add a certain grasping force to the flexible grasping. Based on this unique rigid-flexible coupling design, and the cooperation of the sector gear and the partial gear, the rigid-flexible coupling gripper of the embodiment of the present application can have the following states.

(1) In the initial state before the rigid-flexible coupling gripper starts to work, the partial gear 10 and the sector gear 7 are in a non-meshed state, and there is no force transmission and transmission relationship between the two.

(2) After starting to work, if the control system selects the mode mainly for rigid grasping, the toothed portion of the partial gear and the sector gear begin to be meshed with the driving of the motor. At this time, the rigid gripper starts to move under the driving action to prepare for grasping an object, and a certain bending moment is also applied to the flexible gripper. This moment renders the flexible gripper unit to bend and deform. At this time, if the rigid gripper stops moving, the flexible gripper still maintains a certain bending state, because the flexible gripper and the rigid gripper are connected in parallel. If the flexible gripper is inflated at this point, it adds better wrapability to the rigid gripper. Alternatively, after starting the work, if the control system selects the grasping mode mainly with flexibility, the motor is not used to drive the rigid gripper but a pneumatic driven flexible gripper is used. At this moment, the flexible gripper starts to bend and deform under the driving action to prepare for grasping an object. At the same time, this bending deformation can also drive the rigid gripper to produce a certain movement in the same direction, so as to increase the grasping force for the flexible grasping.

(3) During operation, when it is necessary to switch from the rigid-based grasping mode to the flexible-based grasping mode, the motor drive may be directly stopped and the pneumatic drive unit may be turned on. Even if the toothed portion of the partial gear is still in mesh with the sector gear at this time, during the bending deformation of the flexible gripper driven by the pneumatic drive unit, since the motor stops driving, the partial gear and the sector gear are substantially jammed, and the flexible gripper may also move part of a joint of the rigid gripper (for example, the joint close to the fingertip). On the contrary, when it is required to switch from the mainly flexible-based grasping mode to the mainly rigid grasping mode, the pneumatic drive unit is stopped, the motor drive unit is started, the motor drives the partial gear to rotate, and the rigid gripper moves under the state where the toothed portion is meshed with the sector gear, providing a greater clamping force. In the embodiment of the present application, the ratio of the circumference ratio of the toothed portion to the non-toothed portion of the partial gear is 15:12 to 19:12, and the toothed portion occupies a greater proportion than that of the non-toothed portion.

Figure 4:
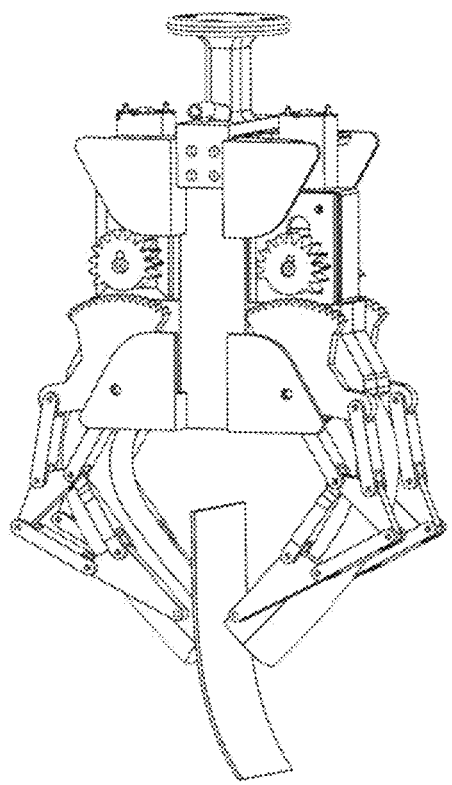
FIG. 4 is a schematic view of a rigid-flexible coupling gripper grasping a paper sheet according to Embodiment 1 of the present application.

The flexible grippers of embodiments of the present application are sufficiently flexible and conformable to closely conform to the shape of a sheet of paper. Referring to FIGS. 2 and 4, when the flexible gripper is pressurized, it flexes inward, creating a clamping force. When the flexible gripper is bent to a certain angle, it is just able to clamp the paper, and no pressure is applied to complete the clamping action. According to the specific operation steps, inflation is performed from the outer inflation tube 14, the gas flows to two inner gas guide tubes 18 after passing through the three-way gas pipe joint 17, and each of the inner gas guide tubes 18 is directly inserted into a small-opening end of the flexible gripper connecting block 20. Finally, the gas is filled into the hollow structure of the flexible finger inner layer 21 of the flexible gripper, so that the flexible gripper is bent until the fingertip portion is adhered to the paper, thereby clamping the paper without damage.

Figure 5:
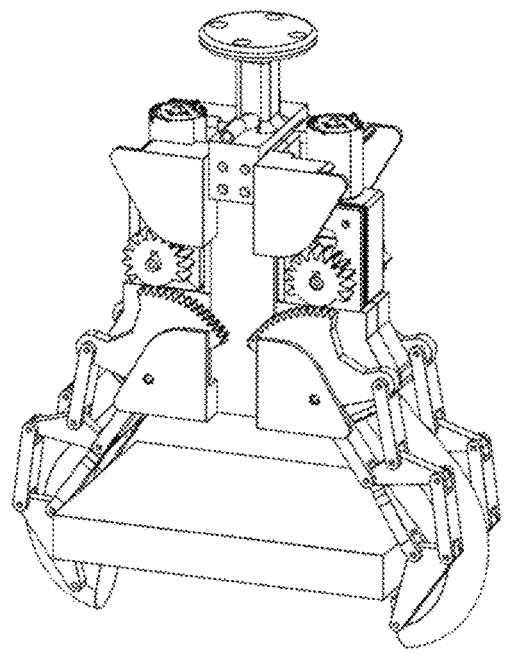
FIG. 5 is a schematic view of a rigid-flexible coupling gripper grasping a rectangular parallelepiped according to Embodiment 1 of the present application.
Figure 6:
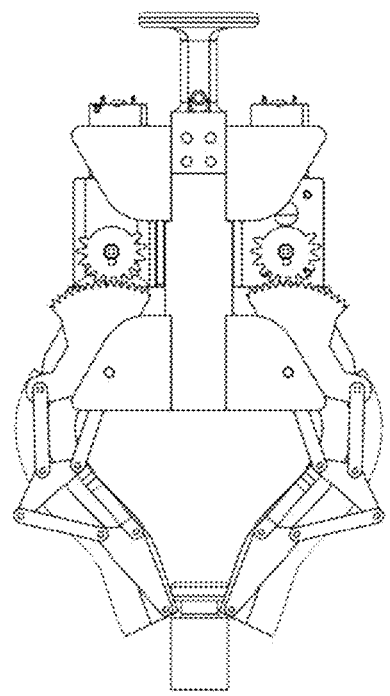
FIG. 6 is a schematic view of a rigid-flexible coupling gripper grasping a weight according to Embodiment 1 of the present application.

As shown in FIG. 5, the rigid-flexible coupling gripper of the embodiment of the present application can conform well to the surface of an object and ensure a stable grasping effect when grasping a large cuboid object. In a particular embodiment, the rigid-flexible coupling gripper exhibits excellent adaptability, facing objects of different shapes and sizes, to grasp by adjusting different modes of operation by mode switching. First, the rigid gripper unit of the rigid-flexible coupling gripper can be bent and stretched according to the shape and size of the object to adapt to the shape of the object. By controlling the rotation of the two-axis motor such that the toothed portion of the partial gear is meshed with the sector gear, and bending in different directions can be achieved due to the rigid gripper having a plurality of joints so as to closely conform to each face of the cuboid. Secondly, the flexible gripper unit also plays a key role. When the rigid gripper unit is fully extended, the flexible gripper can be self-adaptively adjusted according to the shape and hardness of the object by pressurizing it so that it has sufficient elasticity and recovery. When the flexible gripper is in contact with the cuboid, the strain limiting layer can closely conform to the surface of the object, increasing friction and reducing vibration, ensuring stability and accuracy of grasping.

In addition, in order to demonstrate the grasping effect of the rigid-flexible coupling gripper of the embodiment of the present application in grasping objects of different weights, another embodiment of the present application also selects a heavier weight as the grasping object. This embodiment uses a combination of a motor drive unit and a pneumatic drive unit to achieve stable grasping. Firstly, when the weight needs to be grasped, the control system controls the motor to rotate so as to drive the partial gear 10 to rotate, so that the toothed portion thereof is meshed with the sector gear 7, thereby driving the rigid gripper to bend or extend, so as to achieve the initial grasping of the weight. Secondly, the pneumatic drive unit is controlled by the control system to inflate the flexible grippers as required to further enhance the grasping force by pneumatic pressure. The pneumatic drive has the advantage of being able to flexibly adjust the gas pressure according to the weight of the object and the need for grasping, so as to achieve stable grasping of objects of different weights. At the same time, the strain limiting layer can closely conform to the surface of the weight under the action of gas pressure, increasing friction and reducing vibration, improving the stability and accuracy of grasping.

In other embodiments, on the basis of the Embodiment 1 described above, the rigid-flexible coupling gripper may further include a suction cup grasping unit and a second pneumatic drive unit, wherein the suction cup grasping unit is mounted at the end of a free end of the flexible gripper unit and/or the rigid gripper unit, and the suction cup grasping unit is respectively connected in parallel with the flexible gripper unit and the rigid gripper unit; and the second pneumatic drive unit is connected to the suction cup grasping unit. Since the rigid-flexible coupling gripper has the above-mentioned structure, the control method for the rigid-flexible coupling gripper further includes: when the object to be grasped needs suction cup grasping, controlling the second pneumatic drive unit to drive the suction cup grasping unit to grip the object to be grasped by the suction cup grasping unit.

A rigid-flexible coupling gripper additionally provided with a suction cup grasping unit and a second pneumatic drive unit and a control method thereof will be described below by way of Embodiment 2.

Embodiment 2

Figure 9:
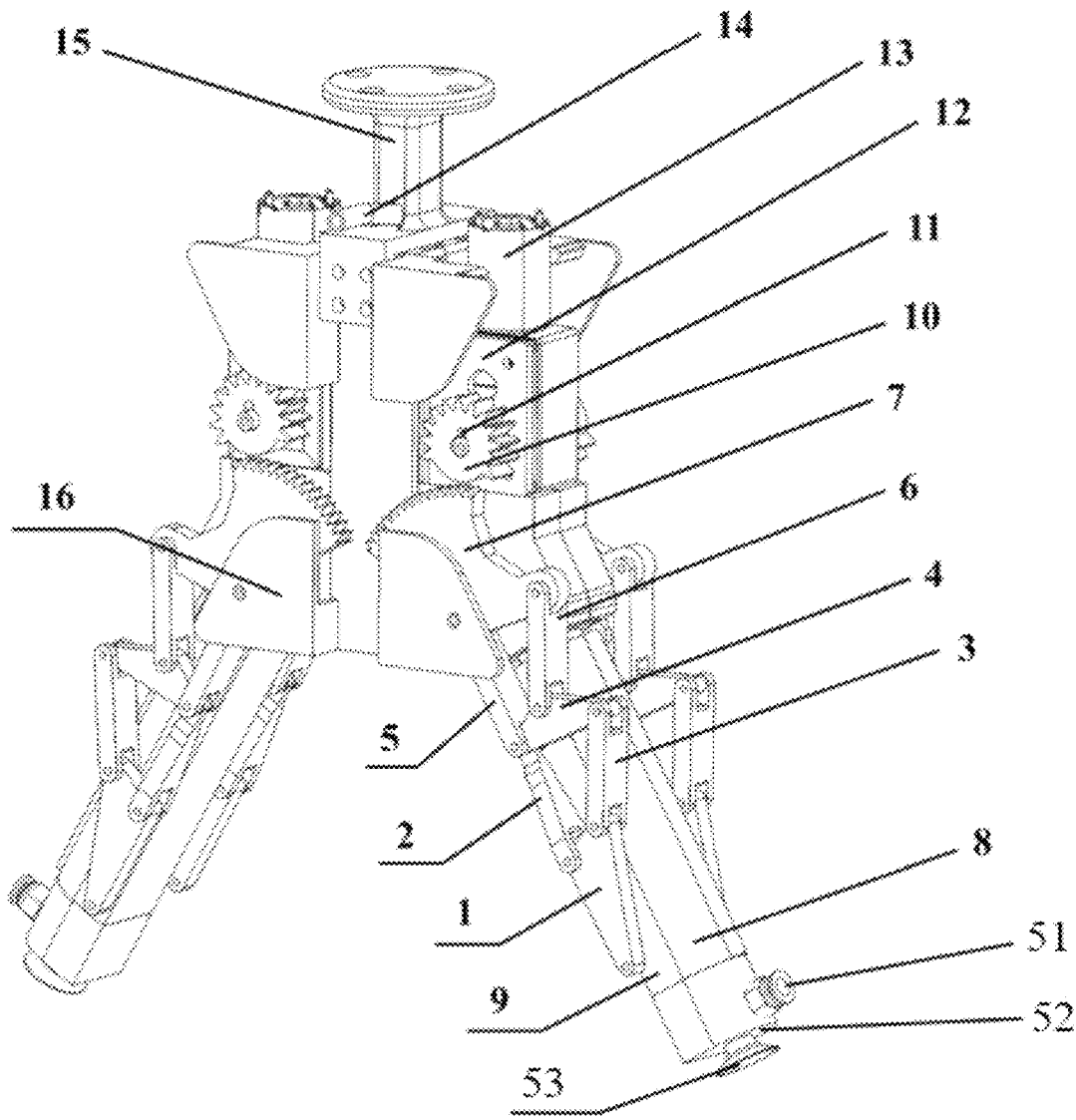
FIG. 9 is a front view of a rigid-flexible coupling gripper according to Embodiment 2 of the present application.

As shown in FIG. 9, the structure of the rigid-flexible coupling gripper in the present embodiment differs from the structure of the rigid-flexible coupling gripper in Embodiment 1 only in that a suction cup grasping unit and a second pneumatic drive unit (not shown in the figure) are additionally provided in the present embodiment. The suction cup grasping unit is mounted at an end of a free end of the flexible gripper unit, and the suction cup grasping unit is respectively connected in parallel with the flexible gripper unit and the rigid gripper unit. The second pneumatic drive unit is connected to the suction cup grasping unit so as to be able to drive the suction cup grasping unit to grab an object to be grasped via the suction cup grasping unit when the object to be grasped requires suction cup grasping.

Herein, the suction cup grasping unit includes two suction cup grasping mechanisms with the same structure and symmetry, each suction cup grasping mechanism is respectively mounted on a fingertip end of a corresponding flexible gripper. Each suction cup grasping mechanism includes a pneumatic connector 51 of the suction cup, a suction cup fingertip 52 and a suction cup 53. A gas channel is provided inside the suction cup fingertip 52 for gas transmission. The second pneumatic drive unit is connected to the pneumatic connector 51 of the suction cup to move gas through the pneumatic connector 51 of the suction cup along the gas passage into the suction cup fingertip 52 and finally to the suction cup 53 so as to drive the suction cup grasping mechanism to suck the object to be grasped. Herein, the suction cup 53 can be a Bernoulli suction cup or a vacuum suction cup. When using the Bernoulli suction cup, it can be unnecessary to additionally provide a negative pressure device, but the suction force is relatively smaller than that of the vacuum suction cup. It is more suitable for an object with a smooth surface. The suction force when using the vacuum suction cup is high. It is also more suitable for the object with relatively unsmooth surface as well as the one-dimensional object, but the negative pressure device is additionally provided.

Other structures of the structure of the rigid-flexible coupling gripper in the present embodiment are the same as those of the rigid-flexible coupling gripper in Embodiment 1, and the description thereof will be omitted.

The control method of the rigid-flexible coupling gripper of the present embodiment is further described below, and includes the following steps:

B1: the step of grasping the object to be grasped and the grasping type in each step are determined according to the action to be performed by the object to be grasped, the grasping type including at least one of rigid grasping, flexible grasping and suction cup grasping; and B2: a corresponding grasping action is performed according to the grasping type in each step:

B21: when the object to be grasped needs to be grasped rigidly, the motor is controlled to rotate so as to drive the partial gear to rotate until the toothed portion is meshed with the sector gear, so that the rigid gripper can move driven by the motor via the partial gear and the sector gear;

B22: when the object to be grasped needs to be grasped flexibly, the pneumatic drive unit is controlled to drive the flexible gripper unit to generate a bending deformation;

B23: when the object to be grasped needs to be grasped flexibly and does not need to be grasped rigidly, the motor is controlled to stop driving or controlling the motor to rotate so as to drive the partial gear to rotate until the non-toothed portion corresponds to the sector gear (non-meshed state), and the pneumatic drive unit is controlled to drive the flexible gripper unit to generate a bending deformation; and B24: when the object to be grasped needs suction cup grasping, the second pneumatic drive unit is controlled to drive the suction cup grasping unit to grasp the object to be grasped by the suction cup grasping unit.

When the grasping type in the corresponding step only includes rigid grasping, the step B21 is performed;
 when the grasping type in the corresponding step only includes flexible grasping, the step B23 is performed;
 when the grasping type in the corresponding step only includes suction cup grasping, the step B24 is performed;
 when the grasping types in the corresponding steps include both rigid grasping and flexible grasping, the step B21 and the step B22 are performed simultaneously;
 when the grasping types in the corresponding steps include both rigid grasping and suction cup grasping, the step B21 and the step B24 are performed simultaneously;
 when the grasping types in the corresponding steps include both flexible grasping and suction cup grasping, the step B23 and the step B24 are performed simultaneously; and
 when the grasping types in the corresponding steps include all rigid grasping, flexible grasping, and suction cup grasping, the step B21, the step B22, and the step B24 are performed simultaneously.

The suction cup grasping unit, the rigid grasping unit and the flexible grasping unit are all connected in parallel, and may be driven adaptively according to the position of the suction cup grasping unit in the actual grasping process.

Figure 10:
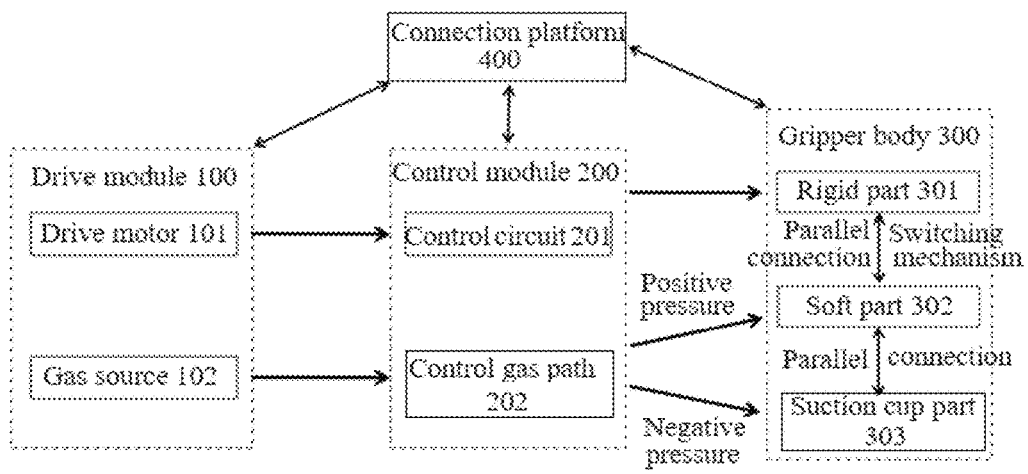
FIG. 10 is a control system block diagram of a rigid-flexible coupling gripper according to Embodiment 2 of the present application.

As shown in FIG. 10, the above-mentioned control system for the rigid-flexible coupling gripper may include a drive module 100, a control module 200 and a connection platform 400. The drive module 100 includes a drive motor 101 (corresponding to the above-mentioned motor drive unit) and a gas source 102 (corresponding to the above-mentioned pneumatic drive unit and the second pneumatic drive unit) for providing motive power for a gripper body 300 (corresponding to the support unit, the rigid gripper unit, the flexible gripper unit and the suction cup grasping unit of the above-mentioned rigid-flexible coupling gripper). The control module 200 includes a control circuit 201 and a control gas path 202 for controlling the output force of the gripper body 300 in different modes. The connection platform 400 includes a mechanical connection platform, a circuit connection platform, and a gas path connection platform. The drive motor 101 in the drive module 100 drives a rigid part 301 (corresponding to the rigid gripper unit) in the gripper body 300 by controlling the control circuit 201 in the control module 200. The gas source 102 in the drive module 100 drives the soft part 302 (corresponding to the flexible gripper unit) and the suction cup part 303 (corresponding to the suction cup grasping unit) of the gripper body via the control gas path 202 in the control module 200. When an object is grasped, by adjusting the switching module, the rigid part 301 (corresponding to the above-mentioned rigid gripper unit), the soft part 302 (corresponding to the above-mentioned flexible gripper unit) and the suction cup part 303 (corresponding to the above-mentioned suction cup grasping unit) in the gripper body 300 may work independently of each other and also work together to accomplish the grasping of the complex object in cooperation. The driving motor 101 in the drive module 100 can be either a stepping motor (which can be a PWM speed regulator) or a worm gear motor (which needs to be additionally provided with a direct current motor driving plate to achieve accurate control) for providing the power used by the rigid part of the gripper. The gas source 102 in the drive module 100 may be an air compressor or a gas pump to provide power for use by the soft part 302 and the suction cup portion 303 of the gripper. The principle of controlling the gas path 202 may use solenoid valve deployment.

The control method for the rigid-flexible coupling gripper in the present embodiment may achieve some smart operations by combining and controlling different grasping units, for example, a rotation operation of an object to be grasped. According to the specific operation steps, in response to the rotating action of the object to be grasped, the steps of determining that the object to be grasped is grasped are as follows:

C1: the motor is driven to perform rigid grasping of the object to be grasped and/or the pneumatic drive unit is driven to perform flexible grasping of the object to be grasped;

C2: the driving the motor and/or the pneumatic drive unit are stopped until the rigid gripper unit performing rigid grasping and/or the suction cup grasping unit on the corresponding side of the flexible gripper unit performing flexible grasping contact the surface of the object to be grasped;

C3: the second pneumatic drive unit is controlled to drive the suction cup grasping unit of the corresponding side to perform the suction cup grasping; and C4: the drive motor rotates the rigid gripper of the corresponding side in the opposite direction and/or reduces the gas pressure of the pneumatic drive unit, so that the object to be grasped performs a rotating action.

In the specific execution of the above-mentioned steps, in the step C1, only the rigid gripper and/or the flexible gripper on one side may be used to perform rigid grasping or flexible grasping on the object to be grasped. Correspondingly, in the steps C2 and C3, the suction cup grasping unit on the corresponding side performs suction cup grasping. In step C4, the corresponding rigid gripper and/or flexible gripper performs restoration so as to achieve a rotation action (namely, the drive motor rotating in the reverse direction and/or the gas pressure restoration of the second pneumatic drive unit may enable the whole of the object to be grasped to be rotated by a certain angle; and the more the drive rotating in the reverse direction, the greater the rotation angle, until the desired position is reached; that is, the motor and/or the second pneumatic drive unit driven in the reverse direction may be stopped). In addition, it can be understood that: when only rigid grasping is used in the step C1, the step C4 also corresponds to reversely rotate using the rigid gripper; when only the flexible grasping is used in the step C1, the step C4 also corresponds to reducing the gas pressure of the flexible gripper; and when the rigid gripper and the flexible gripper are simultaneously used in the step C1, the step C4 also corresponds to reversely rotate and reducing the gas pressure of the flexible gripper simultaneously by using the rigid gripper.

The control method of the rigid-flexible coupling gripper in the present embodiment will be described in further detail according to specific examples.

Example 1 (Rotating Fragile Objects/Lighter Objects, e.g., Eggs, Water Cups without Water)

In the initial state, the object to be grasped naturally assumes an axis vertical state due to gravity, so that the axes of the rigid-flexible coupling gripper and the mechanical arm are the same axis, and the axis of the rigid-flexible coupling gripper is spatially perpendicular to the axis of the object to be grasped. The rigid-flexible coupling gripper is performed as follows:

a1: the pneumatic drive unit is controlled to drive the single-side flexible gripper to generate a bending deformation (taking the right side as an example), where the two rigid grippers on the right side follow but do not apply a driving force to the motor, the suction cup on the right side also follows but does not apply a pressure, and the rigid grippers, the flexible grippers and the suction cup on the left side are all immobile;

a2: it stops inflating the pneumatic drive unit until the end of the right-side flexible gripper (namely, a right suction cup) contacts the object to be grasped (for example, a right suction cup contacts the surface of the egg or the wall surface of the water cup); at this moment, the right-side flexible gripper is fixed, the right rigid gripper is also fixed, and the right suction cup is adhered to the surface of the egg or the wall surface of the water cup;

a3: the second pneumatic drive unit is controlled to drive the suction cup on the right side to suck and hold the egg surface or the wall surface of the water cup;

a4: after the right suction cup sucks and stabilizes the object, the pneumatic drive unit corresponding to the right flexible gripper reduces the gas pressure/deflates, the right suction cup keeps the state, and the object to be grasped will be rotated by a certain angle at this moment; and a5: the driving of the second pneumatic drive unit is stopped, the right suction cup is canceled, and the flexible gripper and the rigid gripper are also returned to the initial position.

Example 2 (Rotating Harder Objects/Heavier Objects, e.g., Water Cups with Water)

In the initial state, the object to be grasped naturally assumes an axis vertical state due to gravity, so that the axes of the rigid-flexible coupling gripper and the mechanical arm are the same axis, and the axis of the rigid-flexible coupling gripper is spatially perpendicular to the axis of the object to be grasped. The rigid-flexible coupling gripper is performed as follows:

b1: the drive motor further enables the single-side rigid gripper to move (taking the right side as an example), the flexible gripper on the right side will follow but not drive the pneumatic drive unit, the suction cup on the right side will follow but not apply pressure, and the rigid gripper, the flexible gripper and the suction cup on the left side are all immobile;

b2: it stops driving the motor until the end of the right flexible gripper (namely, the right suction cup) contacts the object to be grasped (for example, the right suction cup contacts the surface of the egg or the wall surface of the water cup); at this moment, the right rigid gripper is fixed, the right flexible gripper is also fixed therewith, and the right suction cup is adhered to the wall surface of the water cup;

b3: the second pneumatic drive unit is controlled to drive the suction cup on the right side to suck and hold the wall surface of the water cup;

b4: after the right side suction cup sucks the stable object, the driving motor returns the right rigid gripper (namely, reversely rotating), and the right suction cup maintains the state, and at this moment, the object to be grasped will be rotated by a certain angle; and b5: the driving of the second pneumatic drive unit is stopped, the right suction cup is canceled, and the flexible gripper and the rigid gripper are also returned to the initial position.

Examples 1 and 2 adopt the flexible gripper or the rigid gripper respectively in cooperation with the suction cup to achieve the rotating operation of the object to be grasped.

Example 3 (Collecting Water by Water Cups)

The rigid-flexible coupling gripper is performed as follows:

c1: the pneumatic drive unit is controlled to drive the flexible grippers on the both sides to generate the bending deformation; the rigid grippers on the both sides to follow; at this moment, the cup is free of water, and the flexible grippers may be used for operation;

c2: the mechanical arm drives the water cup to move to a water source;

c3: the drive motor further enables the rigid grippers on both sides to move so as to stop driving the pneumatic drive unit; and c4: after the water is filled in the water cup, the whole water cup is driven back to a target position by the rigid gripper.

Example 4 (Grasping a Needle, a Paper or a Glass Plate)

The rigid-flexible coupling gripper is performed as follows:

d1: the robot arm is rotated so that the axis of the suction cup on one side is perpendicular to a plane in which the needle, paper or glass plate is placed (taking the right side as an example); and d2: the second pneumatic unit is driven to drive the suction cup on the right side to suction grip the needle, paper or glass plate.

In this embodiment, on the basis that the rigid gripper and the flexible gripper may be flexibly switched and accurately controlled in Embodiment 1, the suction cup grasping unit is additionally provided, which can combine the excellent grasping fit of the flexible gripper unit, the large grasping mass range of the rigid gripper unit and the special grasping function of the suction cup grasping unit, so that accurate and stable grasping may be realized in a large mass range by a control method. It not only can grab heavy objects such as dumbbells, but also can easily cope with fragile objects such as jelly, bean curd and eggs and special one-dimensional (needle) and two-dimensional objects (such as paper and flat glass sheets). With such a multi-modal grasping strategy, the gripper is enabled to achieve an efficient operation over a wide range of grasping, and may cooperate to perform dexterous operations other than conventional grasping, such as rotational motions, etc.

The foregoing is a further detailed description of the present application, taken in conjunction with specific preferred embodiments, and is not to be construed as limiting the detailed description of the present application. To those skilled in the art to which the application pertains, many equivalents and obvious modifications may be made without departing from the spirit of the application, and the same function or use is to be considered as within the scope of the application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A rigid-flexible coupling gripper, comprising:
a support unit;
a rigid gripper unit and a flexible gripper unit connected to the support unit, wherein the rigid gripper unit and the flexible gripper unit are connected in parallel; the rigid gripper unit comprises a sector gear connected to the support unit and a rigid gripper connected to the sector gear and capable of moving driven by the sector gear;
a motor drive unit connected to the rigid gripper unit and comprising a motor and a partial gear, wherein the partial gear comprises a toothed portion and a non-toothed portion; the motor is connected to the partial gear for driving the partial gear to rotate; the sector gear is configured for being meshed with the toothed portion of the partial gear; the motor is capable of driving the partial gear to rotate until the toothed portion is meshed with the sector gear, and is also capable of driving the partial gear to rotate until the non-toothed portion corresponds to the sector gear, namely, in a non-meshed state; the motor drive unit can switch between driving and non-driving of the rigid gripper unit by switching between the meshed and non-meshed states; and a pneumatic drive unit connected to the flexible gripper unit for driving the flexible gripper unit into a bending deformation;
wherein the flexible gripper unit comprises at least two flexible grippers; the rigid gripper unit comprises at least two sets of rigid grippers; each set of rigid grippers comprises two of the rigid grippers; each set of rigid grippers is respectively connected in parallel with one flexible gripper; the parallel connection renders that: when the rigid gripper moves under the drive of the motor drive unit, the flexible gripper is moved to generate a bending deformation; and the flexible gripper moves the rigid gripper when the flexible gripper undergoes the bending deformation under the drive of the pneumatic drive unit.

2. The rigid-flexible coupling gripper according to claim 1, wherein the two rigid grippers of each set of rigid grippers are located on both sides of the flexible grippers connected in parallel therewith; and finger roots of each of the rigid grippers are respectively connected to one of the sector gears.

3. The rigid-flexible coupling gripper according to claim 1, wherein the motor is a two-axis motor; each set of rigid grippers is driven by one two-axis motor; one of the partial gears is respectively arranged on both sides of each two-axis motor; and the two-axis motor is respectively connected to the partial gear on a side where the two-axis motor is located via keys on the both sides.

4. The rigid-flexible coupling gripper according to claim 1, wherein the ratio of the circumference ratio of the toothed portion to the non-toothed portion of the partial gear is 15:12 to 19:12.

5. The rigid-flexible coupling gripper according to claim 1, wherein the sector gear has a sector central angle of 60°-80°.

6. The rigid-flexible coupling gripper according to claim 1, wherein the motor is capable of driving the rigid gripper to produce an angular change of 5°-58°.

7. The rigid-flexible coupling gripper according to claim 1, wherein the flexible gripper of the flexible gripper unit comprises a flexible finger inner layer, a fiber, a flexible finger surface layer and a strain limiting layer; the flexible finger inner layer has an inflatable hollow structure connected to a gas pump of the pneumatic drive unit, and is inflated and deformed by inflating the flexible finger inner layer; the fiber is wrapped around the periphery of the flexible finger inner layer for limiting lateral expansion of the flexible finger inner layer; the flexible finger surface layer is sheathed on the outside of the flexible finger inner layer and extendable along the length direction driven by the flexible finger inner layer; the strain limiting layer is connected to the flexible finger inner layer, and the deformation thereof is less than the deformation of the flexible finger inner layer, so that the flexible finger inner layer and the flexible finger surface layer bend towards a side where the strain limiting layer is located when inflated, so as to realize the bending deformation of the flexible gripper unit.

8. The rigid-flexible coupling gripper according to claim 7, wherein the rigid gripper comprises a fingertip plate, a first strut, a first link, an intermediate plate, a second strut, and a second link; the fingertip plate has a fingertip end and a first connecting portion and a second connecting portion on opposite sides of the fingertip end, and the intermediate plate has a third connecting portion, a fourth connecting portion and a fifth connecting portion; a first end of the first strut is movably connected to the first connecting portion; a first end of the first link is movably connected to the second connecting portion; a second end of the first strut is movably connected to the third connecting portion; a second end of the first link is movably connected to the fourth connecting portion; a first end of the second strut is movably connected to the third connecting portion; a first end of the second link is movably connected to the fifth connecting portion; a second end of the second strut is movably connected to the sector gear, and a second end of the second link is movably connected to the sector gear; one side of the fingertip plate, the first strut and the second strut are connected to the strain limiting layer of the flexible gripper and are in the same plane as the bottom surface of the strain limiting layer to achieve the parallel connection.

9. The rigid-flexible coupling gripper according to claim 8, wherein a tail portion extending from a central angle of the sector gear, wherein the tail portion is provided with a first mounting hole for mounting the second end of the second link; a second mounting hole is provided at the center of the sector gear for mounting the second end of the second strut; meanwhile, the sector gear is mounted to the support unit via the second mounting hole.

10. The rigid-flexible coupling gripper according to claim 1, wherein the rigid-flexible coupling gripper further comprises a suction cup grasping unit and a second pneumatic drive unit, wherein the suction cup grasping unit is mounted at the end of a free end of the flexible gripper unit and/or the rigid gripper unit, and the suction cup grasping unit is respectively connected in parallel with the flexible gripper unit and the rigid gripper unit; and the second pneumatic drive unit is connected to the suction cup grasping unit.

11. A rigid-flexible coupling gripper, comprising:
a support unit;
a rigid gripper unit and a flexible gripper unit connected to the support unit, wherein the rigid gripper unit and the flexible gripper unit are connected in parallel; the rigid gripper unit comprises a sector gear connected to the support unit and a rigid gripper connected to the sector gear and capable of moving driven by the sector gear;
a motor drive unit connected to the rigid gripper unit and comprising a motor and a partial gear, wherein the partial gear comprises a toothed portion and a non-toothed portion; the motor is connected to the partial gear for driving the partial gear to rotate; the sector gear is configured for being meshed with the toothed portion of the partial gear; the motor is capable of driving the partial gear to rotate until the toothed portion is meshed with the sector gear, and is also capable of driving the partial gear to rotate until the non-toothed portion corresponds to the sector gear, namely, in a non-meshed state; the motor drive unit can switch between driving and non-driving of the rigid gripper unit by switching between the meshed and non-meshed states; and a pneumatic drive unit connected to the flexible gripper unit for driving the flexible gripper unit into a bending deformation;
wherein the sector gear has a sector central angle of 60°-80°.

12. A rigid-flexible coupling gripper, comprising:
a support unit;
a rigid gripper unit and a flexible gripper unit connected to the support unit, wherein the rigid gripper unit and the flexible gripper unit are connected in parallel; the rigid gripper unit comprises a sector gear connected to the support unit and a rigid gripper connected to the sector gear and capable of moving driven by the sector gear;
a motor drive unit connected to the rigid gripper unit and comprising a motor and a partial gear, wherein the partial gear comprises a toothed portion and a non-toothed portion; the motor is connected to the partial gear for driving the partial gear to rotate; the sector gear is configured for being meshed with the toothed portion of the partial gear; the motor is capable of driving the partial gear to rotate until the toothed portion is meshed with the sector gear, and is also capable of driving the partial gear to rotate until the non-toothed portion corresponds to the sector gear, namely, in a non-meshed state; the motor drive unit can switch between driving and non-driving of the rigid gripper unit by switching between the meshed and non-meshed states; and a pneumatic drive unit connected to the flexible gripper unit for driving the flexible gripper unit into a bending deformation;
wherein the motor is capable of driving the rigid gripper to produce an angular change of 5°-58°.

\* \* \* \* \*